United States Patent Office 3,287,358
Patented Nov. 22, 1966

3,287,358
STILBYLBENZOTRIAZOLE BRIGHTENERS
Sigmund C. Catino, Castleton, and Albert F. Strobel, Delmar, N.Y., assignors to General Aniline & Film Corporation, New York, N.Y., a corporation of Delaware
No Drawing. Filed Oct. 22, 1963, Ser. No. 318,065
6 Claims. (Cl. 260—240)

This invention relates to a new class of stilbylbenzotriazole brighteners for fine fabrics.

We have discovered a new class of fluorescent stilbylbenzotriazole compounds which are efficient brighteners when applied to fine fabrics such as polyester, nylon, cellulose acetate, cellulose triacetate, polyethylene, polypropylene, polyvinyl chloride and the like by the dye bath or melt method, as well as in plastic films, oils, waxes and the like. These brightener compounds have the following formula:

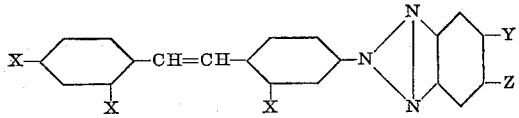

wherein X represents either hydrogen or chlorine, Y represents lower alkoxy, such as methoxy, ethoxy, propoxy, and butoxy, Z represents methyl or lower alkoxy, such as methoxy, ethoxy, propoxy, and butoxy, and Y and Z jointly represent methylenedioxy.

The fluorescent stilbylbenzotriazoles having the foregoing general formula are prepared by dissolving a 4-stilbeneamine of the formula:

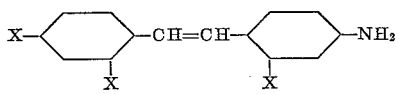

wherein X has the same values as above, in glacial acetic acid, and diazotizing by adding hydrochloric acid and sodium nitrite. After diazotization is complete, 4-methyl-m-anisidine; 3,4-dimethoxyaniline or 3,4-methylenedioxyaniline as the hydrochloride or as a slurry, is added to the diazo in equimolar amount. After coupling has occurred, the monoazo dye is oxidized to the triazole, for example, by heating with copper sulfate in a solvent such as pyridine or picoline. The brightener is isolated by first precipitating and filtering the copper as the sulfide and then separating from the solvent either by steam distillation or by dilution with water and cooling, and then filtering.

The 4-stilbeneamines are prepared in conventional manner by reduction of the corresponding 4-nitrostilbenes. The brightener compound is applied to fabric in a dispersed form. A dispersion may be made by kneading the brightener with a suitable dispersing agent in a Werner-Pfleiderer mixer, or it may be dispersed by dissolving the brightener in a suitable solvent and pouring the solution into water giving a finely divided precipitate. The dispersed brightener is usually applied to the fabric by heating in water together with the fabric for about 45 minutes at a temperature near the boil. The amount of brightener may vary a great deal, and in fact may range from 0.0035% to 0.5% based on the weight of the fiber.

The following examples will illustrate how the fluorescent stilbylbenzotriazoles are prepared and applied to synthetic fibers and the like:

Example 1

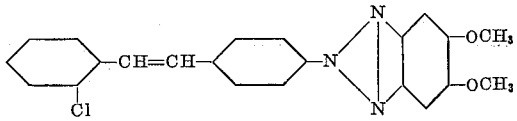

2-(2'-chloro-4-stilbyl)-5,6-dimethoxy-2H-benzotriazole

The intermediate having the formula:

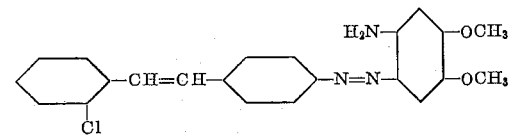

was prepared by dissolving 6.66 grams of 2'-chloro-4-stilbeneamine in 50 cc. of glacial acetic acid and added to a slush of 10 cc. of concentrated hydrochloric acid and 80 grams of ice chips. At 0–2 C. 5.5 cc. of sodium nitrite solution (31.5% solution) was added dropwise over a period of ½ hour. 9.75 grams of 3,4-dimethoxyaniline were dissolved in 25 cc. of glacial acetic acid and added to the diazo solution over a period of 2 hours at 0–5° C. 12 grams of sodium acetate crystals was added. The charge was allowed to stand one hour at 5° C., filtered and washed with cold water.

The material on the filter was combined with 200 cc. of picoline, and heated to 95° C. 18.1 grams of copper sulfate .5 $H_2O$ was added and maintained at 108° C. for one hour. The copper was precipitated with 11.0 grams of sodium sulfide as a 20% solution at 85–90° C., the charge filtered and washed with 200 cc. of picoline. The filtrate and wash were cooled to 0° C. and filtered. The filter cake was washed with an additional 100 cc. of picoline, then 500 cc. of water, then 50 cc. of isopropanol, and air dried. A yield of 7.7 grams was obtained, 67.8% of theory.

APPLICATION 50 milligrams of the 2-(2'-chloro-4-stilbyl)-5,6-dimethoxy-2H benzotriazole was dissolved in 100 mls. of dimethylformamide. 1.0 ml. of the resulting solution was added to 150 mls. of 0.1% "Peregal O" solution (commercially available ethylene oxide condensation product) as a dispersing agent. This total formulation was poured into a launderometer jar together with a 5.0-gram swatch of cellulose acetate fabric together with 10 steel balls. The material was heated at 190–200° F. for 45 minutes. The swatch was removed, rinsed and dried. A comparison of this piece of cloth against a piece similarly treated, with the exception that no brightening compound was added, visibly showed an improved brightness of the treated cloth.

50 mls. of the brightener was dissolved in 100 mls. of dimethylformamide. 5 ml. of the resulting solution was added to 150 mls. of 0.1% "Peregal O" solution. This total formulation was poured into a launderometer jar together with a 5.0-gram swatch of "Dacron 54" polyester fabric together with 10 steel balls. The material was heated at 200° F. for one hour. The swatch was removed, rinsed and dried. This fabric was compared with a second fabric which was treated in the same manner with the exception that no brightener had been added. The treated fabric was visibly brighter and whiter than the untreated fabric.

In the same manner as "Dacron 54" was dyed, "Arnel" triacetate fabric was dyed at 0.03% concentration of dye on the weight of the fabric. A brighter, whiter coloration was obtained on a fabric so treated in contrast to a swatch treated in similar manner but without addition of the brightener.

*Example II*

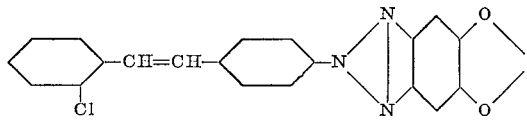

2-(2'-chloro-4-stilbyl)-5-,6-methylenedioxy-2H-benzotriazole.

300 grams of piperonal was dissolved in 800 cc. of warm ethyl alcohol. 166.8 grams of hydroxylamine hydrochloride in 200 cc. of warm water was cooled to 30–50° C. 300 cc. of 40% caustic soda solution was added. This was allowed to stand at room temperature for 2½ hours. 1000 grams of crushed ice was added and saturated with carbon dioxide. It was cooled to 10° C. and filtered, washed with 1500 cc. of water and air dried. The charge was then mixed slowly into 400 cc. of acetic anhydride, and then boiled gently for 20 minutes and drowned into 1200 cc. of water, cooled, filtered and dried. The piperonylnitrile was recrystallized from 1000 cc. of ethyl alcohol in a 62.5% yield.

To 3200 cc. of 3% peroxide solution and 178 cc. of potassium hydroxide (25% solution) was added 92 grams of the piperonylnitrile. It was warmed to 45° C., allowed to stand with stirring for one hour, cooled to 5° C., filtered and air dried. The piperonylamide thus formed had a M.P. of 160–161° C.

340 cc. of 40% caustic soda solution was made to a volume of 790 cc. with water and ice. Chlorine gas was added under the surface. 90.0 grams of piperonylamide was added, it was warmed slowly to 70° C. and stirred for one hour. 205 grams of caustic soda in 205 cc. of water was added slowly. It was heated to 80° C. for one hour, extracted with 100 cc. of benzene. The benzene was distilled off, and the 3,4-methylenedioxyaniline was vacuum distilled (B.P. 111° C. at 0.5 mm.).

A solution of 10 grams of 2'-chloro-4-stilbeneamine in 35 cc. of glacial acetic acid was added to a solution of 75 grams of ice chips, 15 cc. of water and 11.5 cc. of hydrochloric acid. At 8–10° C. was added 8.3 cc. of sodium nitrite solution. It was stirred at 5–10° C. for ½ hour. To this was added slowly 6.55 grams of 3,4-methylenedioxyaniline dissolved in 35 cc. of acetic acid at 50° C. It was stirred for one hour at 10° C., then 40 g. of sodium acetate was added to Congo neutral, filtered and washed with water.

66.2 grams of this dye cake was added to 300 cc. of picoline. After heating to 95° C. 27.25 grams of copper sulfate .5 $H_2O$ was added and it was stirred at 100° C. for 15 minutes. Copper was precipitated with 16.5 grams of sodium sulfide as a 20% solution at 85–90° C. It was filtered at 95° C. and the cake washed with 300 cc. of picoline. It was slurried in 100 cc. of water, filtered, and washed with 100 cc. of picoline, then 750 cc. of water, then 75 cc. of isopropanol. It was recrystallized from 100 cc. of dimethylformamide. $K=175$ at 356 m$\mu$.

This brightener was applied to polyester fabric (Dacron), cellulose acetate, and cellulose triacetate (Arnel) according to the methods of Example I. In all cases dyeings were brighter and whiter than similar dyeings made without the addition of the brightener.

*Example III*

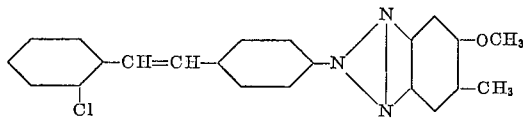

2-(2'-chloro-4-stilbyl)-5-methoxy-6-methyl-2H-benzotriazole.

To a solution of 22 cc. of concentrated hydrochloric acid and 180 g. of ice chips was added 15 grams of 2'-chloro-4-stilbeneamine dissolved in 180 grams of ice water. At 0–2° C. 12.3 cc. of sodium nitrite (31.5% solution) was added in a 10-minute period. It was kept at 0° C. for ½ hour. 14.35 grams of 4-methyl-m-anisidine dissolved in 50 cc. of glacial acetic acid was added to the diazo and maintained at 0–2° C. for one hour. 50 grams of sodium acetate crystals was added and maintained at 5–10° C. for 3 hours. The charge was made Congo blue acid with concentrated hydrochloric acid, filtered, and washed with water. The cake was reslurried in 500 cc. of water made to a pH of 9 with caustic soda, stirred one hour, acidified to Congo blue acidity with concentrated hydrochloric acid, filtered, and washed with water.

The azo compound was treated with 500 cc. of picoline and heated to 90° C. 41 grams of copper sulfate .5 $H_2O$ was added. It was maintained 2 hours at 108° C., and cooled to 85–90° C. Sodium sulfide (20% solution) was added until a positive excess was shown by test with lead acetate. It was filtered at 105° C., and washed with hot picoline. The filtrate was cooled to 0° C., filtered and washed first with 50 cc. of cold picoline, then 500 cc. of water. It was recrystallized from dimethylformamide. $K=158$ at 357 m$\mu$.

Dyeings made on polyester fabric, cellulose acetate and cellulose triacetate in the manner of Example I showed visibly improved brightness over similar dyeings made without the brightener.

*Example IV*

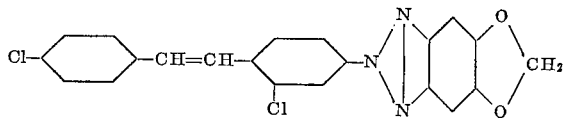

2-(2,4'-dichloro-4-stilbyl)-5,6-methylenedioxy-2H-benzotriazole.

This compound was produced in the same sequence of reactions as in Example II, except that 11.5 grams of 2,4'-dichloro-4-stilbylamine was substituted for the 2'-chloro-4-stilbylamine of Example II. The series of reactions is as follows:

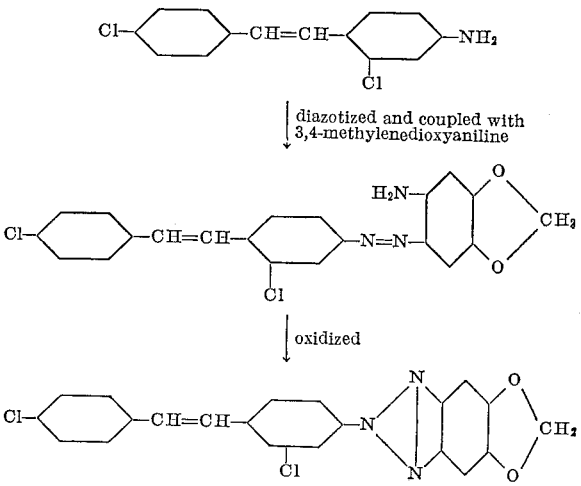

The 2,4'-dichloro-4-stilbeneamine was produced in conventional manner by reduction of 2,4'-dichloro-4-nitrostilbene wherein the 2,4'-dichloro-4-nitrostilbene was dissolved in dimethylformamide and reduced with iron borings in hydrochloric acid solution.

The brightener was applied to polyester fiber, cellulose acetate and cellulose triacetate in the manner of Example I. The dyeings were visibly whiter than a fabric treated in similar manner without the brightening agent.

*Example V*

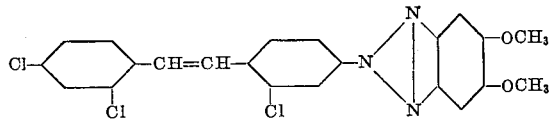

2-(2,2',4'-trichloro-4-stilbyl)-5,6-dimethoxy-2H-benzotriazole.

2,2',4'-trichloro-4-nitrostilbene was prepared by the method of Ullman (Berichte, 41, 2296) substituting an equivalent amount of 2,4-dichlorobenzaldehyde for benzaldehyde in the process of condensing 2-chloro-4-nitrotoluene with benzaldehyde in the presence of piperidine. The compound was reduced in conventional manner by dissolving in dimethylformamide and reducing with iron borings in acid solution. The 2,2',4'-trichloro-4-stilbeneamine was diazotized and coupled with 3,4-dimethoxyaniline, and then oxidized with copper sulfate by the method described in Example I. The brightener was applied to polyester fabric, cellulose acetate and cellulose triacetate in the manner of Example I. The materials, treated with the brightener are visibly whiter than material treated in a similar manner without the brightening agent.

*Example VI*

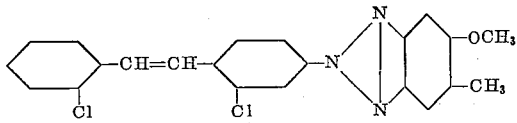

2-(2,2'-dichloro-4-stilbyl)-5-methoxy-6-methyl-2H-benzotriazole.

2,2'-dichloro-4-nitrostilbene was prepared by the Ullman method (Berichte, 41, 2296) substituting an equivalent amount of o-chlorobenzaldehyde for benzaldehyde in the process of condensing 2-chloro-4-nitrotoluene with benzaldehyde in the presence of piperidine. The compound was then reduced to the corresponding amine in usual manner employing iron borings in hydrochloric acid. The amine was then diazotized and coupled with 4-methyl-m-anisidine, and then oxidized with copper sulfate in the manner of Example I.

The triazole brightener was then applied to polyester material, cellulose acetate and cellulose triacetate according to the method described in Example I. The treated materials were visibly brighter than corresponding materials treated in like manner without brightener.

*Example VII*

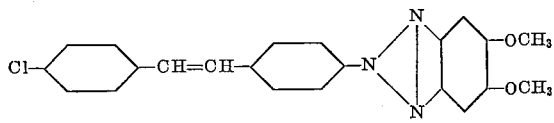

2-(4'-chloro-4-stilbyl)-5,6-dimethoxy-2H-benzotriazole.

4'-chloro-4-nitrostilbene was prepared by the method of Ullman (Berichte, 41, 2296) substituting 4-chlorobenzaldehyde for benzaldehyde in the condensation with p-nitrotoluene in the presence of piperidine. The compound was reduced to 4'-chloro-4-stilbeneamine in conventional manner employing iron borings in a hydrochloric acid medium. The 4'-chloro-4-stilbeneamine was diazotized and coupled with 3,4-dimethoxyaniline and then oxidized with copper sulfate in the manner of Example I.

The triazole brightener thus formed was then applied to polyester material, cellulose acetate, and cellulose triacetate according to the method described in Example I. The treated materials were visibly brighter than corresponding materials treated in like manner without brightener.

*Example VIII*

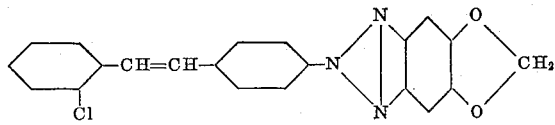

2-(2'-chloro-4-stilbyl)-5,6-methylenedioxybenzo-2H-triazole.

2'-chloro-4-nitrostilbene was prepared by the method of Ullman (Berichte, 41, 2296) substituting 2-chlorobenzaldehyde for benzaldehyde in the process of condensing p-nitrotoluene with benzaldehyde in the presence of piperidine. The compound was reduced to 2'-chloro-4-stilbeneamine in conventional manner employing iron borings in hydrochloric acid medium. The 2'-chloro-4-stilbeneamine was diazotized and coupled with 3,4-methylenedioxyaniline and oxidized with copper sulfate in the manner of Example I.

The triazole brightener thus formed was applied to cellulose acetate, cellulose triacetate, and polyester fiber in the manner of Example I. The treated materials were visibly brighter than corresponding materials treated in like manner without brightener.

*Example IX*

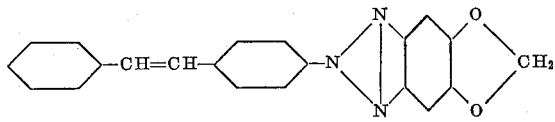

2-(4-stilbyl)-5,6-methylenedioxy-2H-benzotriazole.

4-stilbylamine was diazotized and coupled with 3,4-methylenedioxyaniline. This compound was oxidized with copper sulfate in the manner of Example I.

The triazole brightener thus formed was applied to cellulose acetate, cellulose triacetate and polyester fiber in the manner of Example I. The treated materials were visibly brighter than corresponding materials treated in like manner without brightener.

*Example X*

50 mg. of the brightener compound of Example VIII was dissolved in 100 mls. of dimethylformamide. 1 ml. of this solution was poured into 200 mls. of water. To this was added 15 mls. of a 0.1% "Peregal O" (commercially available ethylene oxide condensation product surfactant). This total formulation was poured into a launderometer jar together with a 5.0 g. swatch of Avisun polypropylene fabric (American Viscose Corp.) together with 10 steel balls. The material was heated at 190–200° F. with rotation for 45 minutes. The swatch was removed, rinsed and dried. Comparative brightness readings of this material in contrast to untreated material indicated a great improvement in brightness. Light fastness of the dyed fabric was outstanding.

*Example XI*

Example X was repeated with the exception that 50 mg. of the brightener compounds of Examples I, III, IV and IX were dyed individually on swatches of polypropylene. In all cases comparative brightness readings of these materials in contrast to untreated material indicated a great improvement in brightness.

*Example XII*

200 grams of polymerized "Dacron" polyester was melted in a tank under nitrogen at 280° C. To the melt was added 0.04 gram (0.02%) of brightener compound of Example I. The latter dissolved at this temperature, and was stirred thoroughly into the polymer to form a homogeneous mixture. Then 4 grams of titanium dioxide was added as a delustrant. The whole mass was stirred until a completely homogeneous mixture was obtained. Thereupon it was forced thru a spinneret, cooled with a water spray, the filament stretched during final cooling, and then taken upon reels in conventional manner.

Cloth made from this fiber has a definitely whiter hue than cloth made by the same process but omitting the brightener. Further, the brightened cloth obtained by this method is faster to light than cloth after treated in a textile bath with the brightener in conjunction with a carrier such as p-phenylphenol (the p-phenylphenol is used to give better penetration and exhaust of the brightener on "Dacron").

*Example XIII*

10 grams of dimethyl terephthalate, 4.85 grams of ethylene glycol, and 0.003 gram of sodium catalyst were heated for 3 hours at 200° C. in a stream of pure nitrogen. At this point 0.30 gram (=0.02%) of the brightener compound of Example II was added to the polymer. The low molecular weight product was heated at 280° C. for 30 minutes, then further heated for 10 hours in a vacuum. During the heat conversion a slow current of nitrogen was introduced thru a capillary tube. The final product melted at 260° C. (The methyl alcohol by-product of the ester interchange is removed during the heating period.) The product as formed was extruded in molten form as a ribbon, cooled with a water spray, then cut into chips. The chips were melted in the absence of oxygen and water, then extruded thru orifices to give the desired shape. Fibers can be made in continuous filament form or cut into short segments as staple with a definite and pronounced whiteness.

*Example XIV*

In a manner similar to Example X, a dyeing was made on a 5.0-gram swatch of low pressure polyethylene fabric. In this case, also, a much improved brightness was obtained over a similar, but untreated piece of cloth.

We claim:
1. A fluorescent stilbylbenzotriazole brightener compound having the following formula:

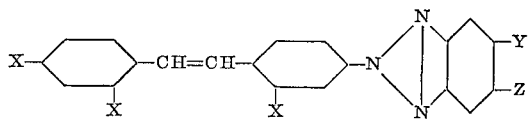

wherein X represents a member selected from the group consisting of hydrogen and chlorine, Y represents lower alkoxy, Z represents a member selected from the group consisting of methyl and lower alkoxy, and wherein Y and Z jointly represent methylenedioxy.

2. A fluorescent stilbylbenzotriazole brightener compound having the following formula:

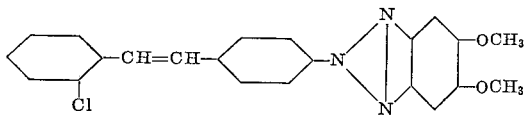

3. A fluorescent stilbylbenzotriazole brightener compound having the following formula:

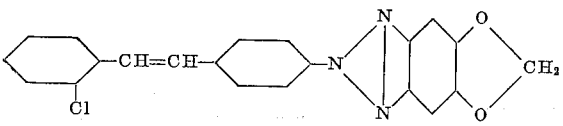

4. A fluorescent stilbylbenzotriazole brightener compound having the following formula:

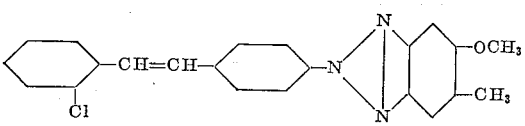

5. A fluorescent stilbylbenzotriazole brightener compound having the following formula:

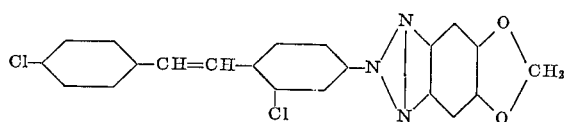

6. A fluorescent stilbylbenzotriazole brightener compound having the following formula:

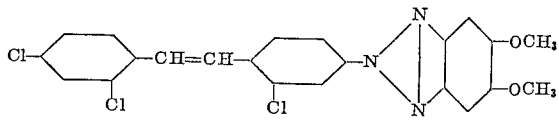

References Cited by the Examiner

UNITED STATES PATENTS 2,713,057   7/1955   Zweidler et al. ____ 260—240 X
2,972,611   2/1961   Zweidler et al. _____ 260—240

FOREIGN PATENTS 1,262,740   4/1961   France.

JOHN D. RANDOLPH, *Primary Examiner.*